United States Patent
Huss et al.

(10) Patent No.: US 11,962,416 B2
(45) Date of Patent: *Apr. 16, 2024

(54) IMPLEMENTATION OF HARQ ON PUSCH FOR MULTIPLE CARRIERS

(71) Applicant: Telefonaktiebolaget LM Ericsson (publ), Stockholm (SE)

(72) Inventors: Fredrik Huss, Sundbyberg (SE); Peter Bengtsson, Sundbyberg (SE); Yu Yang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,619

(22) Filed: Feb. 3, 2023

(65) Prior Publication Data
US 2023/0179338 A1 Jun. 8, 2023

Related U.S. Application Data

(63) Continuation of application No. 17/086,795, filed on Nov. 2, 2020, now Pat. No. 11,606,171, which is a
(Continued)

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1829* (2013.01); *H04L 5/001* (2013.01); *H04L 1/1896* (2013.01)

(58) Field of Classification Search
None
See application file for complete search history.

(56) References Cited

U.S. PATENT DOCUMENTS

| | | | |
|---|---|---|---|
| 8,767,797 | B2 | 7/2014 | Sambhwani |
| 9,848,390 | B2 | 12/2017 | Baldemair et al. |

(Continued)

FOREIGN PATENT DOCUMENTS

| | | |
|---|---|---|
| CN | 101414899 A | 4/2009 |
| CN | 101610586 A | 12/2009 |

(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Multiplexing and channel coding (Release 12)", Technical Specification, 3GPP TS 36.212 V12.4.0, Mar. 1, 2015, pp. 1-94, 3GPP, France.

(Continued)

*Primary Examiner* — Hong Shao
(74) *Attorney, Agent, or Firm* — COATS & BENNETT, PLLC

(57) ABSTRACT

A method for operating a network node of a wireless communication network is disclosed. The method comprises determining and/or adjusting a HARQ signaling format for a terminal configured for carrier aggregation based on a number of DL carriers and/or a number of HARQ bits configured for the terminal.

16 Claims, 7 Drawing Sheets

Related U.S. Application Data continuation of application No. 15/032,215, filed as application No. PCT/SE2016/050299 on Apr. 11, 2016, now Pat. No. 10,862,628.

(60) Provisional application No. 62/210,722, filed on Aug. 27, 2015, provisional application No. 62/145,887, filed on Apr. 10, 2015.

(51) Int. Cl.
*H04L 1/1867* (2023.01)
*H04L 5/00* (2006.01)

(56) References Cited

U.S. PATENT DOCUMENTS

| | | |
|---|---|---|
| 2011/0235534 A1 | 9/2011 | Ratasuk et al. |
| 2011/0310820 A1 | 12/2011 | Liao |
| 2012/0113907 A1 | 5/2012 | Baldemair et al. |
| 2012/0327885 A1 | 12/2012 | Chung et al. |
| 2013/0107852 A1 | 5/2013 | Han et al. |
| 2013/0156011 A1 | 6/2013 | Suzuki et al. |
| 2013/0265938 A1 | 10/2013 | Jain et al. |
| 2013/0301550 A1 | 11/2013 | Kim et al. |
| 2014/0126491 A1 | 5/2014 | Ekpenyong |
| 2014/0198737 A1 | 7/2014 | Papasakellariou |
| 2015/0289211 A1 | 10/2015 | Lee et al. |

FOREIGN PATENT DOCUMENTS

| | | |
|---|---|---|
| CN | 102450074 A | 5/2012 |
| CN | 102577210 A | 7/2012 |
| CN | 103283286 A | 9/2013 |
| JP | 2013529405 A | 7/2013 |
| WO | 2011157233 A1 | 12/2011 |

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.5.0, Mar. 1, 2015, pp. 1-239, 3GPP, France.

Samsung, "HARQ-ACK Transmission for Enhanced CA", 3GPP TSG RAN WG1 #80, Athens, Greece, Feb. 9, 2015, pp. 1-4, R1-150749, 3GPP.

NTT Docomo, "Simulation results for PUSCH ACK/NACK performance w/o implementation margins", TSG-RAN Working Group 4 Meeting #49bis, Ljubljana, Slovenia, Jan. 12, 2009, pp. 1-5, R4-090057, 3GPP.

ITL Inc., "Uplink control signaling enhancements for b5C CA", 3GPP TSG RAN WG1 Meeting #80, Athens, Greece, Nov. 17, 2014, pp. 1-8, R1-150489, 3GPP.

ZTE, Details of Multi-Cell HARQ-ACK and Periodic CSI Multiplexing, 3GPP TSG RAN WG1 Meeting #70, Qingdao, China, Aug. 13-17, 2012, R1-123391.

Intel Corporation, Discussion on CA enhancement for release 13, 3GPP TSG-RAN GW1 #80, Athens, Greece, Feb. 9-13, 2015, R1-150086.

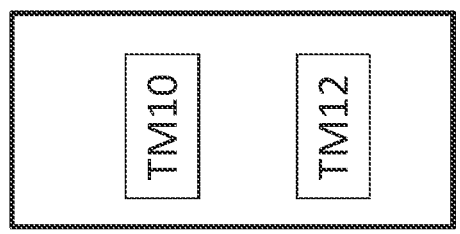

IMPLEMENTATION OF HARQ ON PUSCH FOR MULTIPLE CARRIERS

RELATED APPLICATIONS

The present application is a continuation of U.S. patent application Ser. No. 17/086,795, filed 2 Nov. 2020, which is a continuation of U.S. patent application Ser. No. 15/032,215, filed 26 Apr. 2016, now U.S. Pat. No. 10,862,628, which was a national stage application of PCT/SE2016/050299 filed 11 Apr. 2016, which claims the benefit of U.S. Provisional Application No. 62/210,722, filed 27 Aug. 2015, and claims the benefit of the U.S. Provisional Application No. 62/145,887, filed 10 Apr. 2015, the disclosures of each of which are incorporated herein by reference in their entirety.

TECHNICAL FIELD

The present disclosure pertains to wireless communication technology, in particular in the context of the use of multi carriers or carrier aggregation.

BACKGROUND

In modern wireless communication technology, usage of carrier aggregation is becoming more and more widespread. In carrier aggregation, multiple carriers (for uplink and/or downlink) may be used in an aggregated manner to increase data throughput. In a carrier aggregate, the carriers are usually not used equally, but are used asymmetrically, e.g. in terms of what kind of signals are transmitted on which carrier. For example, there may be one or more carriers associated to at least one Primary Cell (PCell), and one or more carriers associated to one or more Secondary Cells (SCells). In particular important control signaling is often limited to the PCell. With the possibility of using a large number of carriers (e.g., 5 or more) for a carrier aggregate, questions regarding control signaling and signaling overhead arise, in particular if specific kinds of controls signaling associated to a plurality of carriers is to be concentrated on a limited number of carriers, and/or there are different numbers of carriers aggregated for downlink than for uplink. For example one carrier may be chosen to transmit uplink HARQ (Hybrid Automatic Repeat reQuest) signaling for a plurality of carriers of a downlink carrier aggregate.

SUMMARY

It is an object of this disclosure to describe approaches allowing efficient HARQ operation in a plurality of carrier aggregation scenarios, in particular in scenarios with a large number of aggregated carriers.

According to one approach, there is disclosed a method for operating a network node of a wireless communication network. The method comprises determining and/or adjusting a HARQ signaling format for a terminal configured for carrier aggregation based on a number of downlink (DL) carriers and/or a number of HARQ bits configured for the terminal. The method may comprise configuring the terminal for and/or with the determined and/or adjusted HARQ signaling format.

A network node for a wireless communication network may be considered. The network node is adapted for determining and/or adjusting a HARQ signaling format for a terminal configured for carrier aggregation based on a number of DL carriers and/or a number of HARQ bits configured for the terminal. The network node may be adapted for configuring the terminal for and/or with the determined and/or adjusted HARQ signaling format.

Moreover, there is proposed a method for operating a terminal in a wireless communication network. The terminal is configured for carrier aggregation. The method comprises determining and/or adjusting a HARQ signaling format of the terminal based on a number of DL carriers and/or a number of HARQ bits configured for the terminal. The method may comprise transmitting HARQ feedback based on the HARQ signaling format.

A terminal for a wireless communication network is also disclosed. The terminal is adapted for carrier aggregation. Furthermore, the terminal is adapted for determining and/or adjusting a HARQ signaling format based on a number of DL carriers and/or a number of HARQ bits configured for the terminal. The terminal may also be adapted for transmitting HARQ feedback based on the HARQ signaling format.

There is also disclosed a program product comprising code executable by control circuitry, the code causing the control circuitry to carry out and/or control any one of the methods for operating a terminal or network node as described herein, in particular if executed on control circuitry, which may be control circuitry of a terminal or a network node as described herein.

Moreover, there is disclosed a storage medium storing at least any one of the program products described herein and/or code executable by control circuitry, the code causing the control circuitry to perform and/or control at least any one of the methods described herein.

The approaches described facilitate efficient HARQ operating by allowing adapting the HARQ signaling format to changing carrier aggregation scenarios, respectively to utilize a suitable HARQ signaling format for scenarios with a large number of carriers being aggregated, in particular in the downlink. The network node is enabled to adapt to HARQ signaling from the terminal and/or to configure the terminal for such signaling, based on the carrier aggregation scenario, which may be considered to be represented or parametrized by the number of DL carriers and/or the HARQ bits. The HARQ bits may represent the number of HARQ bits associated to the HARQ feedback pertaining to the DL carriers, the HARQ feedback to be transmitted by the terminal on the uplink (UL).

Generally, determining and/or adjusting a HARQ signaling format may comprise determining and/or adjusting a coding, in particular error detection coding. The coding may pertain to the coding of the HARQ bits and/or HARQ feedback. Accordingly, the size of data blocks including the HARQ bits/feedback may be adapted, as well as the likelihood of errors in (respectively, error detection and/or correction of) the HARQ bits/feedback.

It may be considered that determining and/or adjusting a HARQ signaling format comprises determining and/or adjusting a modulation, and/or a number of symbols Q' used for modulation. This facilitates adapting the resources (time/frequency resources) utilized for HARQ feedback, in particular adapting them to the carrier aggregation scenario. Determining and/or adjusting a HARQ signaling format may comprise adjusting and/or determining a HARQ-ACK offset, $\beta_{offset}^{PUSCH}$. This offset is particularly suitable to adapt the number of symbols.

It may generally be considered that determining and/or adjusting a HARQ signaling format may comprise determining whether the number of HARQ bits is above a bit threshold, in particular a bit threshold of 22 bits, and/or whether the number of DL carriers is above 5. Determining and/or adjusting the HARQ signaling format may be based on determining whether the number of HARQ bits is above a bit threshold, in particular a bit threshold of 22 bits, and/or whether the number of DL carriers is above 5.

BRIEF DESCRIPTION OF THE DRAWINGS

The drawings are provided to illustrate concepts and approaches of the disclosure and are not intended as limitation. The drawings comprise:

FIG. 7, showing another exemplary terminal.

DETAILED DESCRIPTION

The use of LTE carrier aggregation (CA), introduced in Rel-10 and enhanced in Rel-11, provides means to increase the peak data rates, system capacity and user experience by aggregating radio resources from multiple carriers that may reside in the same band or different bands and, for the case of inter-band TDD CA, may be configured with different UL/DL configurations. In Rel-12, carrier aggregation between TDD and FDD serving cells is introduced to support UE connecting to them simultaneously. The concepts described herein are of particular use for LTE carrier aggregation, but may also be relevant for other RAT supporting CA.

In Rel-13, LAA (Licensed-Assisted Access) has attracted a lot of interest in extending the LTE carrier aggregation feature towards capturing the spectrum opportunities of unlicensed spectrum in the 5 GHz band. WLAN operating in the 5 GHz band nowadays already supports 80 MHz in the field and 160 MHz is to follow in Wave 2 deployment of IEEE 802.11ac. There are also other frequency bands, such as 3.5 GHz, where aggregation of more than one carrier on the same band is possible, in addition to the bands already widely in use for LTE. Enabling the utilization of at least similar bandwidths for LTE in combination with LAA as IEEE 802.11ac Wave 2 will support calls for extending the carrier aggregation framework to support more than 5 carriers. The extension of the CA framework beyond 5 carriers was approved to be one work item for LTE Rel-13. The objective is to support up to 32 carriers in both UL and DL.

Compared to single-carrier operation, a UE operating with CA, in particular in the downlink, has to report feedback for more than one DL component carriers. Meanwhile, a UE does not need to support DL and UL CA simultaneously. For instance, the first release of CA capable UEs in the market only supports DL CA but not UL CA. This is also the underlying assumption in the 3GPP RAN4 standardization. Therefore, an enhanced UL control channel, i.e. PUCCH format 3 was introduced for CA during Rel-10 timeframe. However, in order to support more component carriers in Rel-13, the UL control channel capacity becomes a limitation.

Figure 1:
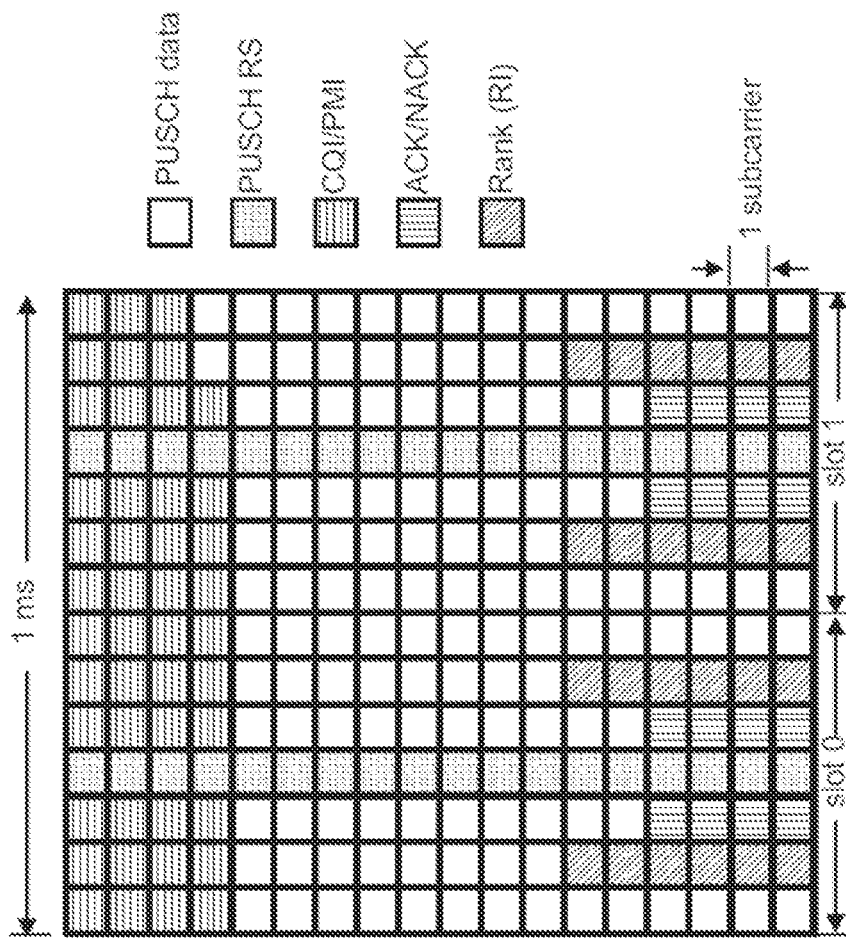
FIG. 1, showing multiplexing of control signaling with UL-SCH data.

HARQ and/or CSI feedback over UL SCH data is discussed in the following. When UCI (Uplink Control Information) is to be transmitted in a subframe in which the UE has been allocated transmission resources for the PUSCH, the UCI is multiplexed together with the UL-SCH data prior to DFT spreading, in order to preserve the low CM single-carrier property; the PUCCH is never transmitted in the same subframe as the PUSCH in Releases 8 and 9. The multiplexing of CQI/PMI, HARQ ACK/NACK, and RI with the PUSCH data symbols onto uplink resource elements (REs) is shown in FIG. 1.

The number of REs used for ACK/NACK is based on the MCS assigned for $\beta_{offset}^{HARQ-ACK}$, which is semi-statically configured by higher-layer signaling. The HARQ ACK/NACK resources are mapped to SC-FDMA symbols by puncturing the UL-SCH PUSCH data. Positions next to the RS are used, so as to benefit from the best possible channel estimation. The maximum amount of resource for HARQ ACK/NACK is 4 SC-FDMA symbols. The coded RI symbols are placed next to the HARQ ACK/NACK symbol positions irrespective of whether ACK/NACK is actually present in a given subframe. The modulation of the 1- or 2-bit ACK/NACK or RI is such that the Euclidean distance of the modulation symbols carrying ACK/NACK and RI is maximized. The outermost constellation points of the higher-order 16/64-QAM PUSCH modulations are used, resulting in increased transmit power for ACK/NACK/RI relative to the average PUSCH data power.

In 3GPP TS36.212, the channel coding of control information is specified in 5.2.2.6 where the number of coded modulation symbols per layer for HARQ are given by below equations.

For the case when only one transport block is transmitted in the PUSCH $$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$ (Equation 1)

For the case when two transport blocks are transmitted in the PUSCH (Equation 2)

$$Q' = \max[\min(Q'_{temp}, 4 \cdot M_{sc}^{PUSCH}), Q'_{min}]$$

$$\text{with } Q'_{temp} = \left\lceil \frac{O \cdot M_{sc}^{PUSCH-initial(1)} \cdot N_{symb}^{PUSCH-initial(1)} \cdot}{\sum_{r=0}^{C^{(1)}-1} K_r^{(1)} \cdot M_{sc}^{PUSCH-initial(2)} \cdot N_{symb}^{PUSCH-initial(2)} +} \right.$$
$$\left. \sum_{r=0}^{C^{(2)}-1} K_r^{(2)} \cdot M_{sc}^{PUSCH-initial(1)} \cdot N_{symb}^{PUSCH-initial(1)} \right\rceil$$

The denotation of the parameters can be found in 3GPP TS36.212. In short, the number of coded modulation symbols per layer may depend on the number of HARQ-ACK bits O, and/or HARQ-ACK offset $\beta_{offset}^{PUSCH}$ and/or the code rate on PUSCH. Note that HARQ-ACK offset $\beta_{offset}^{PUSCH}$ is signaled by a high layer index according to Table 8.6.3-1 in 3GPP TS 36.213, which is copied below. Generally, the HARQ-ACK offset may be mapped and/or represented by a corresponding value or parameter or index, e.g. $I_{offset}^{HARQ\text{-}ACK}$ or $I_{offset,MC}^{HARQ\text{-}ACK}$, which may be an index for mapping to a table, e.g. table 1 below. Accordingly, Q' may be based on and/or be dependent on $\beta_{offset}^{PUSCH}$.

Table 1 shows a mapping of HARQ-ACK offset values and the index signaled by higher layers (Table 8.6.3-1 in 3GPP TS 36.213).

| $I_{offset}^{HARQ\text{-}ACK}$ or $I_{offset,MC}^{HARQ\text{-}ACK}$ | $\beta_{offset}^{HARQ\text{-}ACK}$ |
|---|---|
| 0 | 2.000 |
| 1 | 2.500 |
| 2 | 3.125 |
| 3 | 4.000 |
| 4 | 5.000 |
| 5 | 6.250 |
| 6 | 8.000 |
| 7 | 10.000 |
| 8 | 12.625 |
| 9 | 15.875 |
| 10 | 20.000 |
| 11 | 31.000 |
| 12 | 50.000 |
| 13 | 80.000 |
| 14 | 126.000 |
| 15 | 1.0 |

HARQ-ACK bits for 32 DLCCs are discussed in the following. The number of HARQ-ACK bits increases linearly with the number of aggregated DL carriers. When there are up to 32 configured DL CCs:

FDD: there are up to 64 HARQ-ACK bits per III (Rank 2 transmission)

TDD: the number of HARQ-ACK bits to be feedback depends on the number of configured CCs and UL/DL subframe configuration of the DL CCs. Assume there are 32 DL CCs with UL/DL subframe configuration 2 and transmission mode 3, there are up to 256 (32*4*2) HARQ-ACK bits.

Due to aggregation of a large number of DL carriers, the HARQ-ACK bits may increase significantly and occupy many resources on PUSCH. This may result in excessive puncturing on PUSCH, which affects the data transmissions on PUSCH.

One observation is that with few HARQ-ACK bits, a large value of $\beta_{offset}^{PUSCH}$ may be needed in order to perform DTX detection, in particular to determine if HARQ-ACK bits are included in the transmission or not. With increasing number of HARQ-ACK bits, the efforts and problems of performing DTX detection increase as well.

The reason is that since the number of symbols Q' is proportional to the number of HARQ-ACK bits, the number of possible transmission hypotheses for the DTX case grows faster than the number of allowed codewords for the non-DTX case. Thus when a fixed value of $\beta_{offset}^{PUSCH}$ is used independently of the number of HARQ-ACK bits, there will be inefficient use of PUSCH resources due to excessive puncturing.

There is disclosed an approach to adjust the number of HARQ-ACK resources on PUSCH in accordance with the number of configured DL carriers, in particular by determining and/or adjusting the HARQ-ACK offset $\beta_{offset}^{PUSCH}$ based on the number of configured DL carriers.

The transmission of HARQ-ACK on PUSCH is optimized for the case when there are a large number of DL carriers and hence many HARQ-ACK bits. This approach provides robustness on HARQ-ACK transmission as well as better data transmission on PUSCH. Generally, there is described a method for operating a network node compris-ing, and/or a network node adapted for and/or comprising a module (e.g. a HARQ module or HARQ signaling module) for, determining and/or adjusting a HARQ signaling format, e.g. for HARQ/ACK transmission by a terminal, based on a number of DL carriers and/or a number of HARQ information bits (e.g. ACK/NACK bits) configured for the terminal, in particular carriers configured for carrier aggregation (e.g. DL carrier aggregation) and/or HARQ information bits associated to one or more such carriers. The module may comprise and/or be implemented as a modulation module, e.g. as described herein. Alternatively or additionally, the module may comprise and/or be implemented as a coding module.

Determining and/or adjusting a HARQ signaling format generally may comprise determining and/or adjusting a coding, e.g. a HARQ coding, e.g. by a coding module, which may be a module for determining and/or adjusting an encoding or coding, e.g. a HARQ coding. An encoding or coding may generally comprise channel coding. In particular, a coding may identify or indicate a code and/or coding type and/or algorithm to be used for coding and/or decoding. Determining and/or adjusting a HARQ signaling format and/or coding and/or modulation based on the number of DL carriers and/or number of HARQ information bits may comprise changing between, and/or using, different codings and/or modulations based on the number of DL carriers and/or number of HARQ information bits (which may be referred to as HARQ bits or HARQ-ACK bits, the latter in particular if they indicate ACK/NACK), in particular changing between, and/or using, a first format, e.g. first coding, e.g. channel coding, and/or first modulation, and a second format, e.g. second coding, e.g. channel coding, and/or second modulation. Determining and/or adjusting on a number (e.g. of DL carriers and/or HARQ bits) may comprise determining whether the number is above (and/or below or equal) to a predetermined threshold, e.g. a bit threshold (for HARQ bits, which in particular may be 22). Alternatively or additionally, determining and/or adjusting a HARQ signaling format generally may comprise determining and/or adjusting a modulation, and/or a number of symbols Q' used for modulation, for HARQ/ACK transmission by a terminal based on a number of DL carriers and/or HARQ bits configured for the terminal, in particular carriers configured for carrier aggregation (e.g. DL carrier aggregation).

Generally, there is described a method for operating a network node comprising, and/or a network node adapted for and/or comprising a modulation module for, determining and/or adjusting a modulation, and/or a number of symbols Q' used for modulation, for HARQ/ACK transmission by a terminal based on a number of DL carriers and/or HARQ bits configured for the terminal, in particular carriers configured for carrier aggregation (e.g. DL carrier aggregation).

Additionally or alternatively, a method for operating a network node generally may comprise, and/or the network node may be adapted for and/or comprise a configuring module for, configuring the terminal for and/or with the determined and/or adjusted modulation and/or the HARQ signaling format and/or coding.

Generally, determining and/or adjusting (e.g., a HARQ signaling format) may be considered to be based on a number of DL carriers if it takes into account the total number of carriers and/or a distribution of carriers into and/or number of carriers of different types (e.g. legacy/non-legacy and/or licensed and/or non-licensed), and/or if it considers the number of HARQ bits to be used for the DL carriers.

Configuring the terminal may comprise sending, e.g. to the terminal and/or UE, allocation data, e.g. one or more parameters and/or values representing and/or indicating and/or identifying the modulation and/or HARQ signaling format and/or coding. Configuring may be performed in particular via RRC signaling and/or RRC communication or sending.

Moreover, there is disclosed a method for operating a terminal comprising, and/or a terminal adapted for and/or comprising a receiving module for receiving allocation data indicating a modulation, and/or a number of symbols Q' used for modulation, and/or a HARQ signaling format, and/or coding, for HARQ/ACK transmission (in particular for a number of DL carriers configured for the terminal, which may be carrier aggregated) by the terminal and/or configuring the terminal accordingly. The receiving and/or configuring may be performed via RRC signaling and/or RRC communication or sending.

Alternatively or additionally, there may be considered a method for operating a terminal comprising, and/or a terminal adapted for and/or comprising a determining module for, determining and/or adjusting a HARQ signaling format and/or coding and/or modulation and/or number of symbols Q' used for modulation based on the number of DL carriers and/or the number of HARQ bits to be used, e.g. for HARQ transmission or HARQ feedback (HARQ feedback may generally be seen as a form of HARQ transmission). Determining and/or adjusting may generally comprise obtaining the number of DL carriers and/or number of HARQ bits to be used, e.g. by reading corresponding data from a memory and/or based on a configuration of the terminal.

The terminal may determine and/or adjust (e.g. by configuring itself accordingly) the HARQ signaling format and/or modulation and/or number of symbols and/or coding, based on the received allocation data, and/or may be adapted accordingly and/or comprise a HARQ format module for such determining and/or adjusting.

Alternatively or additionally, the method may comprise, and/or the terminal may be adapted for and/or comprise a transmitting module for, transmitting HARQ feedback and/or HARQ transmission (e.g. HARQ data and/or a corresponding block) based on the allocation data and/or based on the HARQ signaling format and/or coding and/or modulation and/or number of symbols, which may be based on the received data and/or the number of DL carriers or HARQ bits. Such transmitting may comprise encoding and/or modulating, e.g. the HARQ feedback and/or HARQ bits according to the HARQ signaling format and/or coding and/or modulation and/or number of symbols.

In a variant, there may be considered a method for operating a network node comprising, and/or a network node adapted for and/or comprising an offset module for: adjusting and/or determining a HARQ-ACK offset $\beta_{offset}^{PUSCH}$ (the offset or HARQ-ACK offset) and/or a value thereof and/or a value or parameter representing (e.g. allowing 1-to-1 mapping to) the offset (which may also be referred to as the offset) based on the number of configured DL carriers and/or HARQ bits configured for a terminal. Adjusting and/or determining the offset and/or the corresponding value may comprise determining and/or adjusting a parameter or value representing the offset, e.g. the index $I_{offset}^{HARQ-ACK}$ or $I_{offset,MC}^{HARQ-ACK}$ (the index), which may be represented on a table mapping the index to the offset or value. Determining and/or adjusting the offset may be seen as part of and/or implementation of determining and/or adjusting a modulation, and/or a number of symbols Q' used for modulation, for HARQ/ACK transmission by the terminal (as outlined herein, the modulation/the number Q' are dependent on the offset).

A method for operating a network node may comprise, and/or the network node may be adapted for and/or comprise a sending module for, sending, e.g. to the terminal and/or UE, a parameter and/or value representing the offset, in particular sending the index and/or a value representing the index, e.g. via RRC signaling. Such sending may be seen as part of and/or implemented as configuring the terminal.

Determining and/or adjusting the offset may generally be performed such that and/or include, with increasing number of configured DL carriers (in a carrier aggregation for the terminal) and/or increasing number of HARQ-ACK bits to be transmitted (for the configured DL carriers), a decreasing (e.g. monotonous decreasing) HARQ-ACK offset to be used. It may generally be considered that determining and/or adjusting the HARQ signaling format, e.g. a channel coding or offset, may comprise obtaining the number of DL carriers configured for the terminal (e.g. for a carrier aggregation/aggregate) and/or the number of HARQ bits to be used. Obtaining data, e.g. the number of configured DL carriers, generally may comprise reading (e.g. from a memory and/or table) and/or receiving (e.g. from the network and/or another network node and/or the terminal) and/or determining (e.g. calculating based on available data, which may be read and/or received data). The network node may be adapted for such obtaining and/or comprise an obtaining module for such obtaining.

Generally, the (configured) DL carriers for a terminal may be the DL carriers provided and/or configured and/or used (e.g. by the network, in particular the network node) for carrier aggregation and/or for a carrier aggregate, in particular for a terminal and/or connecting to the terminal and/or connecting the terminal to the network, in particular to the network node.

A method for operating a network node may comprise providing, and/or the network node may comprise, e.g. stored in a memory, which may be accessible to control circuitry of the network node and/or the offset module, one or more different and/or pre-defined mapping tables, wherein each mapping table provides a mapping of an offset/offset value to an index; different table may provide different mappings. Determining and/or adjusting the offset may comprise choosing and/or selecting and/or determining one of the different tables to select and/or determine and/or adjust the offset (and/or corresponding index), in particular based on the number of DL carriers. A pre-defined mapping table may e.g. a mapping table stored and/or programmed into a memory, in particular in a static manner.

Generally, a different mapping table may result from manipulating, and/or performing a mathematical transformation on, a pre-defined and/or given table (e.g. scaling by a given factor, for example multiplying each offset in a table with a constant factor, which may depend on the number of configured DL carriers). In particular, such manipulating may be performed such that the offset (e.g., the offset for each index) is smaller for larger numbers of configured DL carriers (e.g., for each index the corresponding offset in the different tables is smaller for the table/s associated to higher number of configured DL carriers). It may be considered that different codings or corresponding indicators are stored in a memory of the network node (and/or terminal), e.g. in a table structure.

In a variant, determining and/or adjusting the offset may comprise determining that and/or whether the number of configured DL carriers is above a predetermined threshold N, e.g. 5, and/or selecting a new and/or different and/or pre-defined mapping table of HARQ-ACK offset $\beta_{offset}^{PUSCH}$ value and index $I_{offset}^{HARQ-ACK}$ or $I_{offset,MC}^{HARQ-ACK}$, based on which the offset and/or index is determined and/or adjusted.

In one example, the mapping in current HARQ-ACK offset mapping table is scaled down by a factor of M, e.g., 2. In another example, the mapping table of RI offset Table 8.6.3-2 in 3GPP TS 36.213 is used for HARQ-ACK offset mapping. The motivation is to get a smaller value of HARQ-ACK offset than the ones defined in current HARQ-ACK offset mapping table for larger number of configured DL carriers.

Alternatively or additionally, a new equation other than Equation 1 and 2 may be used for calculating the number of coded modulated symbols Q'.

In one example, determining and/or adjusting a modulation, and/or a number of symbols Q' used for modulation, for HARQ/ACK transmission by a terminal may comprise determining the number of symbols Q' as a function of the number of configured DL carriers. In another example for the case when only one transport block is transmitted in the PUSCH, the number of symbols Q' may be given by and/or based upon Equation (A)

$$Q' = \min\left(\left\lceil \frac{O^\gamma \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right),$$

where the exponent γ gives the slope of how much Q' is increased when the number of HARQ-ACK bits is increased. Determining and/or adjusting a modulation, and/or a number of symbols Q' used for modulation, for HARQ/ACK transmission by a terminal may be based on Equation (A) and/or comprise using Equation (A).

Generally, there may be considered that a network node like an eNB, and/or a terminal like a UE, adjusts and/or is adapted to adjust (and/or comprises a corresponding module), the value of a HARQ-ACK offset $\beta_{offset}^{PUSCH}$ and/or a coding, e.g. channel coding, of HARQ-ACK bits based on the number of configured (or activated or scheduled) DL carriers for a UE. $I_{offset}^{HARQ-ACK}$ $I_{offset,MC}^{HARQ-ACK}$. One principle for offset adjustment may comprise that the more DL carriers and/or the larger number of HARQ-ACK bits to be transmitted, the smaller HARQ-ACK offset is used. One principle for encoding adjustment may comprise that, when the number of DL carriers is large and/or above a threshold, e.g. N, (e.g. >5), and/or a large number of HARQ-ACK bits (and/or the number of HARQ bits is above a bit threshold, e.g. 22) is to be transmitted (e.g. >22), a different coding is used than otherwise, e.g. a convolutional code may be used or applied, and otherwise (for cases below the threshold/s), a RM (Reed-Muller) code is used.

It should generally be noted that the number of HARQ bits to be used (e.g. for HARQ feedback) may be dependent on the number of DL carriers for which the HARQ feedback and/or a corresponding block of HARQ data is to be transmitted. In particular, the larger the number of DL carriers used, the more HARQ processes the UE will have to monitor, and corresponding a larger number of HARQ bits may have to be transmitted. The term HARQ bits (or the corresponding number) may refer to the information bits before encoding. The HARQ-ACK offset index and/or signaling format or coding to be used, e.g. channel coding scheme, may be configured to the UE (which may thus be configured accordingly), e.g. may be sent to the UE via RRC signaling. The network node and/or configuring module of a network node may be adapted accordingly.

In one variant, the terminal or UE may be configured with the HARQ-ACK offset index, which e.g. may be sent to the terminal or UE via RRC signaling the UE. The UE may be adapted to configure itself based on the received HARQ-ACK offset index, in particular configure a HARQ signaling format to be used, e.g. coding and/or modulation. For example, when a large HARQ-ACK offset (e.g., above a predetermined offset threshold) is sent to UE, the UE may configure itself, e.g. autonomously apply, a first HARQ signaling format, e.g. a first channel coding or corresponding scheme. When a small HARQ-ACK offset is sent to the UE, the UE may configure itself, e.g. autonomously apply, a second HARQ signaling format, e.g. a second channel coding or corresponding scheme. The first coding for example may comprise a RM code, the second coding may comprise a convolutional code.

In another example, the terminal or UE may be configured with more than one HARQ-ACK offset indexes, which may be sent to the UE via RRC signaling. For example, when the number of DL carriers for a UE is above a threshold N (e.g. 5) and/or a larger number of HARQ-ACK bits to be transmitted (or the number of HARQ-ACK bits or HARQ bits or HARQ information bits to be transmitted is above a bit threshold) one or more of the smaller HARQ-ACK offset may be applied and/or a convolutional code may be used for encoding; otherwise, one or more large HARQ-ACK offset may be applied and/or a RM code may be used for encoding.

In a further additional or alternative example, the terminal or UE may be configured with the HARQ signaling format, e.g. coding (encoding), in particular with a channel coding or channel coding scheme, which may be sent to the UE via RRC signaling. When a first coding scheme (like a RM code) is applied, one or more large HARQ-ACK offset may be applied; when a second coding scheme (like a convolutional code) is applied, one or more small HARQ-ACK offset may be applied.

In a variant, no RRC signaling is needed between eNB and UE. Rather, determining and/or adjusting the HARQ signaling format, in particular the HARQ-ACK offset and/or the coding (channel coding) to be used, may be based on the number of DL carriers (and/or the number of HARQ bits to be transmitted), For example, when the number of DL carriers for a UE is above a threshold N (e.g. 5) and/or a larger number of HARQ-ACK bits to be transmitted (and/or the number of HARQ bits to be transmitted is above a bit threshold), one or more small HARQ-ACK offset/s may be applied and/or a first channel coding like a convolutional code may be used, e.g. for encoding; otherwise, one or more large HARQ-ACK offset/s may be applied and/or a second channel coding like a RM code may be used, in particular for encoding.

Alternatively or additionally, determining and/or adjusting the HARQ signaling format based on the number of DL carriers configured for a UE or terminal and/or the number of HARQ bits to be transmitted may comprise, when the number of configured carriers is above a predetermined threshold N, e.g. 5, and/or the number of HARQ bits is above a bit threshold, a second mapping table of HARQ-ACK offset $\beta_{offset}^{PUSCH}$ value and index $I_{offset}^{HARQ-ACK}$ or $I_{offset,MC}^{HARQ-ACK}$ is used and/or a second channel coding (e.g. convolutional code) is applied, otherwise a first mapping and/or a first channel coding (e.g. RM code) may be used. In one example, the mapping in current HARQ-ACK offset mapping table may be scaled down (for the second mapping) by a factor of, e.g., 2. In another example, the mapping table of RI offset Table 8.6.3-2 in 3GPP TS 36.213 may be used for HARQ-ACK offset mapping. The motivation is to get a smaller value of HARQ-ACK offset than the ones defined in current HARQ-ACK offset mapping table for a larger number of configured DL carriers. In a further example, the new equation and a second channel coding scheme (convolutional code) may be used when the number of carriers is above a predetermined threshold N, e.g. 5; otherwise the legacy equation (i.e., Equation 1 and 2) and a first channel coding scheme (RM code) may be used.

In a further alternative or additional variant, determining and/or adjusting a modulation, and/or a number of symbols Q' used for modulation, for HARQ/ACK transmission by a terminal may comprise using different equations based on the number of configured DL carriers (for the terminal/in CA). For example, a new equation (e.g. Equation A) may be used when the number of configured carriers is above a predetermined threshold N, e.g. 5; otherwise the legacy equation (i.e., Equation 1 and 2) may be used.

Alternatively or additionally, determining and/or adjusting a modulation, and/or a number of symbols Q' used for modulation, and/or a HARQ signaling format and/or coding for HARQ/ACK transmission by a terminal may comprise performing and/or determining encoding of HARQ-ACK information and/or feedback based on the number of configured DL carriers. It may be based on the received allocation data or configuration. For example, HARQ-ACK information/feedback may be encoded in more than one format depending on which carriers and/or the number of DL carriers configured in DL and/or the number of HARQ bits to be used. If the carriers that are configured belong to a legacy set of carriers (and/or a number of carriers up to 5), the HARQ-ACK bits may be coded according to the current legacy method in 3GPP. The size of the legacy set of carriers could be limited to N e.g. 5. The encoding may use the current legacy method in order to derive the number of symbols Q'.

If at least one carrier is configured which does not belong to the legacy set of carriers, encoding the HARQ-ACK information/feedback may be performed and/or determined in an extended format. The extended format may be determined and/or defined to be able to carry more HARQ-ACK bits (than the legacy format), e.g. up to 256 bits, as in the example above. In another example, if the carriers that are configured are licensed carriers, the HARQ-ACK bits are coded according to the current legacy method in 3GPP; if the carriers that are configured are unlicensed carriers, the HARQ-ACK information is encoded in an extended format which can carry more HARQ-ACK bits.

Alternatively or additionally, HARQ-ACK information may be encoded in more than one format depending on which carriers are scheduled in DL. If the carriers that are scheduled belong to a legacy set of carriers, the HARQ-ACK bits are coded according to the current legacy method in 3GPP. The size of the legacy set of carriers could be limited to, N e.g. 5. The encoding use the current legacy method in order to derive the number of symbols Q'.

If at least one carrier is scheduled which does not belong to the legacy set of carriers, the HARQ-ACK information is encoded in an extended format. The extended format may be determined and/or defined to be able to carry more HARQ-ACK bits, e.g. up to 256 bits as in the example above.

In the network node or eNB, blind detection may be done to determine whether the terminal or UE has encoded the HARQ-ACK information using the legacy encoding or the extended encoding. The blind decoding may be performed as the UE might have missed control information in DL and then transmit with legacy encoding even if extended encoding was expected based on the scheduled carriers. In another example, if the carriers that are configured are licensed carriers, the HARQ-ACK bits are coded according to the current legacy method in 3GPP; if the carriers that are configured are unlicensed carriers, the HARQ-ACK information is encoded in an extended format which can carry more HARQ-ACK bits. Generally, a terminal may be considered to be configured with a carrier, e.g. a DL carrier, if the terminal is (or is to be, e.g. according to a configuration or allocation data not yet transmitted to it) scheduled and/or activated and/or has allocated resources, in particular to receive transmissions on this carrier (e.g., by being assigned, e.g. by a corresponding transmission from a network and/or network node, a corresponding identifier and/or allocation data).

There may be considered a method for operating a network node, and/or a network node adapted for and/or comprising a blind detection module for, performing blind detection on HARQ/ACK feedback received from a terminal based on at least two different HARQ signaling formats, in particular modulations and/or different codings, in particular channel codings. The modulations may differ regarding a number of symbols Q' used for modulation and/or an encoding and/or a format, e.g. an extended format, which may comprise the number of bits to modulate. The format, e.g. modulations and/or coding, to be used may be determined based on the number of DL carriers configured for the terminal (and/or for DL carrier aggregation). One of the formats, e.g. modulations or codings, may be a legacy modulation and/or a modulation determined for up to 5 DL carriers and/or based on table 1, the other modulation or coding may be based on a number of DL carriers larger than the legacy number and/or larger than 5 and/or corresponding to a number of DL carriers configured, which may be larger than 5 and/or a legacy number. The format/s, e.g. modulations and/or coding/s, and/or data representing the format/s, e.g. modulations and/or coding/s, may be stored in a memory of the network node and/or be obtained by the network node, e.g. read and/or received, e.g. from a network and/or another network node and/or a terminal. The method and/or network node may be a network node as described herein, e.g. in regards to determining and/or adjusting the HARQ signaling format and/or modulation and/or coding of the terminal. One of the format/s and/or modulations and/or coding/s used for blind detection may be a modulation for HARQ/ACK information and/or feedback determined and/or adjusted and/or configured to the terminal by network node (or the network or another network node, which may transmit and/or communicate corresponding data/information to the network node) according to any of the variants described herein.

Generally, a network node may be adapted for, and/or comprise a receiving module for, and/or perform (e.g., as part of one of the method for operating a network node described herein) receiving of HARQ feedback from the terminal. Receiving may be based on the determined and/or adjusted HARQ signaling format. It may be considered that receiving comprises detecting and/or demodulating and/or decoding received HARQ feedback based on the determined and/or adjusted HARQ signaling format, and/or based on the assumption that the HARQ feedback is transmitted based on the determined and/or adjusted HARQ signaling format.

There is generally suggested to (for modulation of HARQ-ACK):

Adjust the HARQ signaling format and/or number of HARQ-ACK symbols and/or channel coding. in particular on PUSCH, in accordance with the number of configured and/or scheduled and/or activated DL carriers and/or Use a new equation to calculate the number of HARQ-ACK symbols on PUSCH so that it is not scaled linearly with the number of HARQ-ACK bits and/or Use different formats to transmit HARQ-ACK feedback for carriers belonging to different sets Generally, the number of DL carriers (e.g. configured for or to the terminal), which may be configured in particular for CA (in particular DL CA), in particular may be larger than 2, larger than 5, larger than 10 and/or 32 or less, and/or in particular may be between (including the borders) 6 and 32.

Figure 2:
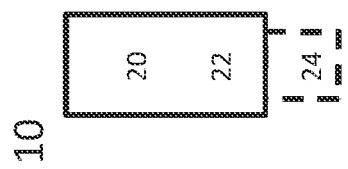
FIG. 2, showing an exemplary terminal.

FIG. 2 schematically shows a terminal 10, which may be implemented in this example as a user equipment. Terminal 10 comprises control circuitry 20, which may comprise a controller connected to a memory. A receiving module and/or transmitting module and/or control or processing module and/or CIS receiving module and/or scheduling module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry. Modules of a terminal as described herein may be implemented in software and/or hardware and/or firmware in corresponding circuitry.

Figure 3:
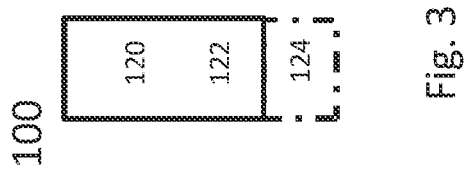
FIG. 3, showing an exemplary network node.

FIG. 3 schematically show a network node or base station 100, which in particular may be an eNodeB. Network node 100 comprises control circuitry 120, which may comprise a controller connected to a memory. A receiving module and/or transmitting module and/or control or processing module and/or scheduling module and/or modulation and/or configuring module, may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. Modules of a network node as described herein may be implemented in software and/or hardware and/or firmware in corresponding circuitry.

Figure 4:
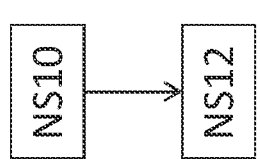
FIG. 4, showing an exemplary method for operating a network node.

FIG. 4 shows a flowchart of an exemplary method for operating a network node, which may be any of the network nodes as described herein. The method may comprise an action NS10 of determining and/or adjusting a HARQ signaling format for a terminal configured for carrier aggregation based on a number of DL carriers and/or a number of HARQ bits configured for the terminal. The method may comprise an action NS12 of configuring the terminal for and/or with the determined and/or adjusted HARQ signaling format.

Figure 5:
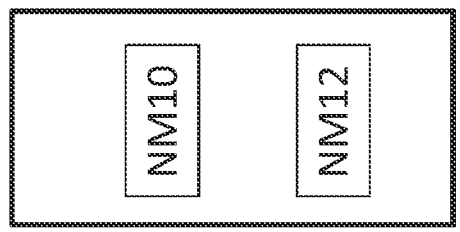
FIG. 5, showing another exemplary network node.

FIG. 5 shows an exemplary network node, which may be any of the network nodes described herein. The network node comprises a module NM10 for performing action NS10. Optionally, the network node may comprise a module NM12 for performing action NS12.

Figure 6:
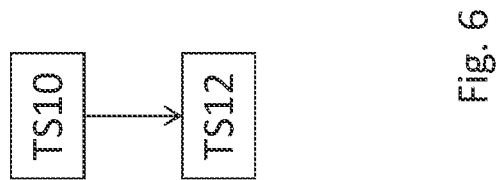
FIG. 6, showing an exemplary method for operating a terminal.

FIG. 6 shows a flowchart of an exemplary method for operating a terminal, which may be any of the terminals as described herein. The terminal is adapted for carrier aggregation. The method may comprise an action TS10 of determining and/or adjusting a HARQ signaling format based on a number of DL carriers and/or a number of HARQ bits configured for the terminal. The method may comprise an action TS12 of transmitting HARQ feedback based on the HARQ signaling format.

FIG. 7 shows an exemplary terminal, which may be any of the terminals described herein. The terminal comprises a module TM10 for performing action TS10. Optionally, the network node may comprise a module TM12 for performing action TS12.

Generally, it may be considered that a HARQ signaling format comprises and/or determines and/or defines a modulation and/or number of symbols and/or a coding, e.g. for a HARQ transmission, e.g. to be utilized and/or which is utilized for HARQ transmission (e.g. for modulating and/or coding HARQ information and/or HARQ data, for example ACK/NACK and/or corresponding HARQ identifiers), in particular to be used by a terminal and/or UE (for encoding) and/or a network node (for decoding). It should be noted that for each coding, there may be an encoding and a corresponding decoding, which may be associated to each other in a reversible manner, such that encoded data may be decoded (and vice versa) in a reproducible and reversible manner (the latter possibly within a given probability of error) such that decoded data corresponds to the data encoded. Generally, a HARQ signaling format may determine and/or define and/or indicate the number of bits a HARQ data block (after modulating and/or encoding the HARQ data to be transmitted within a block) contains.

Coding may comprise error detection coding and/or forward error correction coding (which may also be referred to as channel coding or channel encoding). Coding may generally comprise encoding (e.g., by a UE and/or a corresponding module of the UE) and/or decoding (e.g., by a network node and/or a corresponding module of the node). Encoding in particular may pertain to HARQ data or information, which may comprise ACK/NACK signaling (e.g., one or more ACK/NACK bits) and/or corresponding identifiers, e.g. a HARQ process identifier. Such data or information may comprise channel state information or channel quality information and/or information pertaining to measurements performed by the terminal, e.g. encoded (coded) into a common block of data (e.g. a transport block or block of HARQ information or HARQ data or HARQ data block), Coding HARQ information may generally be performed by a terminal or UE, decoding HARQ information may be performed by a network node. To a coding (in particular encoding), a number of encoding bits (which may be called coding size or coding length) may be associated.

For decoding, the decoding node (e.g. network node) may assume a format or coding, e.g. based on DL carrier number and/or a configuration provided to the encoding node, e.g. terminal or UE (the terminal or UE may generally be adapted to acknowledge receipt of a configuration to the configuring node, e.g. network node).

Generally, carrier aggregation (CA) may refer to the concept of a radio connection and/or communication link between a wireless and/or cellular communication network and/or network node and a terminal comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all of the carriers of the carrier aggregation (the aggregate of carriers). A carrier aggregation may comprise one (or more) dedicated control carriers and/or primary carriers (which may e.g. be called primary component carrier or PCC), over which control information may be transmitted, wherein the control information may refer to the primary carrier and other carriers, which may be referred to as secondary carriers (or secondary component carrier, SCC).

Control information may comprise scheduling information and/or allocation data and/or HARQ signaling, in particular in regards to a DL connection. A communication link may comprise an UL connection and/or a DL connection. It may be considered that a communication link comprise different carriers and/or carrier aggregations for UL and/or DL; in particular, it may be considered that a communication link comprises one or more carriers and/or carrier aggregations for DL and a different number of carriers and/or carrier aggregations for UL, which may use different frequencies than the DL carriers. Carriers in a carrier aggregation may comprise carrier/s in a licensed spectrum and/or carrier/s in an unlicensed spectrum. In particular, carrier/s of an unlicensed spectrum may be secondary carriers of a carrier aggregation. It may be considered that primary carriers are in a licensed spectrum. Generally, before accessing a carrier in an unlicensed spectrum for transmission, a listen-before-talk (LBT) procedure may be performed, e.g. by a correspondingly adapted terminal or network node.

Carriers of a carrier aggregation may belong to different frequency bands, e.g. as defined in a given standard as LTE and/or in terms of frequency and/or spectral width, and/or whether they are licensed or not. Different carriers may be associated to different frequency bands; it may be considered that different frequency bands have different carriers (one or more than one carrier per frequency band may generally be envisaged) associated to them. Licensed bands or spectra may have different frequency bands than unlicensed bands or spectra. A control carrier may be a primary carrier used for control information transmission, e.g. for the transmission of HARQ feedback and/or for CSI information and/or scheduling requests. Generally, a DL carrier aggregation may comprise more than 2, more particular more than 5, in particular between 6 and 32 carriers (including the boundary values).

There may be considered a network node adapted for performing any one of the methods for operating a network node described herein and/or for configuring a terminal as described herein.

There may be considered a terminal adapted for performing any one of the methods for operating a terminal described herein and/or for performing bundling as described herein, in particular according to a configuration configured by a network or network node or system.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a storage medium or carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

An uplink carrier may generally be or indicate a carrier and/or frequency band intended and/or used for uplink transmissions.

A downlink carrier may generally be or indicate a carrier and/or frequency band intended and/or used for downlink transmissions.

A terminal being configured with a cell and/or carrier may be in a state in which it may communicate (transmit and/or receive data) using the cell or carrier, e.g. being registered with the network for communication and/or being synchronized to the cell and/or carrier.

Generally, a node being connected or connectable to a terminal with and/or via a cell or carrier may be adapted for communicating and/or communicate with the terminal using this cell or carrier and/or comprise a corresponding communication link. A terminal being connected or connectable to a network with a cell or carrier may be adapted for communicating and/or communicate with the terminal using this cell or carrier. Connection to a network may refer to connection to at least one node of the network.

Data may refer to any kind of data, in particular any one of and/or any combination of control data or user data or payload data. Control data may refer to data controlling and/or scheduling and/or pertaining to the process of data transmission and/or the network or terminal operation.

Receiving or transmitting on a cell or carrier may refer to receiving or transmitting utilizing a frequency (band) or spectrum associated to the cell or carrier.

A wireless communication network may comprise at least one network node, in particular a network node as described herein. A terminal connected or communicating with a network may be considered to be connected or communicating with at least one network node, in particular any one of the network nodes described herein.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a terminal and/or user equipment and/or base station and/or relay node and/or any device generally adapted for communication in a wireless communication network, in particular cellular communication.

A modulation for HARQ/ACK transmission may comprise a number of symbols $Q'$ used for modulation and/or an encoding and/or a format, e.g. an extended format, which may comprise the number of bits to modulate. Allocation data pertaining to modulation may comprise data indicating (e.g. to a terminal), a number of symbols $Q'$ to be used for modulation and/or an encoding and/or a format, e.g. an extended format, which may comprise the number of bits to modulate.

A cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilizes the radio resources, in particular carriers and/or frequencies, and/or equipment (e.g. circuitry like radio circuitry and/or antenna circuitry, in particular transmitter and/or receiver and/or transceiver) provided and/or used for cellular operation.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN.

A network node may be a base station, which may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, e.g. according to an LTE standard. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for cellular communication between two nodes or terminals of a wireless communication network, in particular two user equipments.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands. A network node, e.g. a base station or eNodeB, may be adapted to provide and/or define and/or control one or more cells, e.g. a PCell and/or a LA cell.

A network node, in particular a base station, and/or a terminal, in particular a UE, may be adapted for communication in spectral bands (frequency bands) licensed and/or defined for LTE. In addition, a network node, in particular a base station/eNB, and/or a terminal, in particular a UE, may be adapted for communication in freely available and/or unlicensed/LTE-unlicensed spectral bands (frequency bands), e.g. around 5 GHz.

Configuring a terminal or wireless device or node may involve instructing and/or causing the wireless device or node to change its configuration, e.g. at least one setting and/or register entry and/or operational mode. A terminal or wireless device or node may be adapted to configure itself, e.g. according to information or data in a memory of the terminal or wireless device. Configuring a node or terminal or wireless device by another device or node or a network may refer to and/or comprise transmitting information and/or data and/or instructions to the wireless device or node by the other device or node or the network, e.g. allocation data and/or scheduling data and/or scheduling grants. Configuring a terminal may include sending allocation data to the terminal indication which modulation and/or encoding to use.

A modulation of and/or modulating HARQ/ACK information/feedback may include an encoding and/or performing encoding. Allocation data configuring or indicating a modulation may include an indication of which encoding to use for HARQ/ACK information/feedback. The term modulation may be used to refer to data (e.g. allocation data) representing and/or indicating the modulation used and/or to be used by a terminal.

A wireless communication network may comprise a radio access network (RAN), which may be adapted to perform according to one or more standards, in particular LTE, and/or radio access technologies (RAT).

A network device or node and/or a wireless device may be or comprise a software/program arrangement arranged to be executable by a hardware device, e.g. control circuitry, and/or storable in a memory, which may provide the described functionality and/or corresponding control functionality.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation or network node, may be adapted to determine and/or transmit corresponding allocation data indicating release or de-allocation of resources to one or more wireless devices, in particular to a first wireless device.

Allocation data may be considered to be data indicating and/or granting resources allocated by the controlling or allocation node, in particular data identifying or indicating which resources are reserved or allocated for communication for a wireless device and/or which resources a wireless device may use for communication and/or data indicating a resource grant or release. A grant or resource or scheduling grant may be considered to be one example of allocation data. Allocation data may in particular comprise information and/or instruction regarding a configuration and/or for configuring a terminal, e.g. indicating a modulation to use, which may comprise an encoding and/or a number of symbols Q' to be used. Such information may comprise e.g. information about which carriers (and/or respective HARQ feedback) to bundle, bundle size, method to bundle (e.g. which operations to perform, e.g. logical operations), etc., in particular information pertaining to and/or indicating the embodiments and methods described herein. It may be considered that an allocation node or network node is adapted to transmit allocation data directly to a node or wireless device and/or indirectly, e.g. via a relay node and/or another node or base station. Allocation data may comprise control data and/or be part of or form a message, in particular according to a pre-defined format, for example a DCI format, which may be defined in a standard, e.g. LTE. Allocation data may comprise configuration data, which may comprise instruction to configure and/or set a user equipment for a specific operation mode, e.g. in regards to the use of receiver and/or transmitter and/or transceiver and/or use of transmission (e.g. TM) and/or reception mode, and/or may comprise scheduling data, e.g. granting resources and/or indicating resources to be used for transmission and/or reception. A scheduling assignment may be considered to represent scheduling data and/or be seen as an example of allocation data. A scheduling assignment may in particular refer to and/or indicate resources to be used for communication or operation.

HARQ ACK/NACK (acknowledge for a correctly received block of data, not acknowledged for a not correctly received block of data) feedback may refer to feedback (e.g. a corresponding signal transmitted, which may comprise 1 or more bits) provided (e.g. on the UL) by a terminal, e.g. to a network or network node in response to data transmitted to it (e.g. on the DL). HARQ ACK//NACK information or feedback (or shorter HARQ-ACK information or feedback or HARQ information or feedback or just HARQ) may include transmitting a signal/bot indicating whether a transport block of data receiver by the terminal has been receiver correctly or not. HARQ and/or determining HARQ may include decoding and/or error detection procedures to determine correct reception. There may be defined a number of HARQ processes with associated HARQ ids or numbers, which may refer to individual data streams; a HARQ response or feedback from a terminal (e.g. a HARQ bit) may be associated to one of the HARQ processes or ids. In some variant, HARQ feedback may comprise one bit per DL carrier; in other variant, HARQ feedback may comprise two (or more than two) bits per carrier, e.g. dependent on the rank used. Generally, HARQ feedback may be transmitted (and/or determined, e.g. based on received signals and/or transport blocks and/or data and/or HARQ process identifiers) by a terminal, and/or a terminal may be adapted for, and/or comprise a HARQ module for, determining (e.g., as mentioned above) and/or transmitting HARQ feedback, in particular based on and/or using a configuration and/or a modulation configured, e.g. a modulation determined and/or configured as described herein. Transmitting HARQ may generally be performed on a UL control channel, e.g. PUSCH.

A coding type and/or code and/or corresponding algorithm may be for error detection coding or channel coding. A coding type for channel coding may in particular be a convolutional code or turbo code or RM code Determining a value may comprise figuring out and/or setting this value, e.g. based on data provided in a memory and/or a configuration and/or received. Adjusting a value may comprise setting and/or changing the value, e.g. based on determining a value.

Some useful abbreviations include:
3GPP 3rd Generation Partnership Project
Ack/Nack Acknowledgment/Non-Acknowledgement, also A/N
AP Access point
B1, B2, . . . Bn Bandwidth of signals, in particular carrier bandwidth Bn assigned to corresponding carrier or frequency
  f1, f2, . . . , fn
BER/BLER Bit Error Rate, BLock Error Rate;
BS Base Station
CA Carrier Aggregation
CCA Clear Channel Assessment
CIS Transmission Confirmation Signal
CoMP Coordinated Multiple Point Transmission and Reception
CQI Channel Quality Information
CRS Cell-specific Reference Signal
CSI Channel State Information
CSI-RS CSI reference signal
D2D Device-to-device
DCI Downlink Control Information
DL Downlink
  Downlink; generally referring to transmission of data to a node/into a direction further away from network core (physically and/or logically); in particular from a base station or eNodeB terminal; more generally, may refer to transmissions received by a terminal or node (e.g. in a D2D environment); often uses specified spectrum/bandwidth different from UL (e.g. LTE)
DMRS Demodulation Reference Signals
DRS Discovery Reference Signal
DTX Discontinuous Transmission
eNB evolved NodeB, base station
eNB evolved NodeB; a form of base station, also called eNodeB
EPDCCH Enhanced Physical DL Control CHannel
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_DL, . . . , fn_DL Carrier for Downlink/in Downlink frequency or band
f1_UL, . . . , fn_UL Carrier for Uplink/in Uplink frequency or band
FDD Frequency Division Duplexing
HARQ Hybrid Automatic Repeat reQuest
ID Identity
L1 Layer 1
L2 Layer 2
LA Licensed Assisted
LAA Licensed Assisted Access
LBT Listen-before-talk
LTE Long Term Evolution, a telecommunications standard
MAC Medium Access Control
MBSFN Multiple Broadcast Single Frequency Network
MCS Modulation and Coding Scheme MDT Minimisation of Drive Test
NW Network
O&M Operational and Maintenance
OFDM Orthogonal Frequency Division Multiplexing
OSS Operational Support Systems
PC Power Control
PCFICH Physical Control Format Indicator Channel
PDCCH Physical Downlink Control Channel
PDCCH Physical DL Control CHannel
PH Power Headroom
PHR Power Headroom Report
PMI Precoding Matrix Indicator
PRB Physical Resource Block
PSS Primary Synchronization Signal
PUCCH Physical Uplink Control Channel
PUSCH Physical Uplink Shared CHannel
RA Random Access
RACH Random Access CHannel
RAT Radio Access Technology
RB Resource Block
RE Resource Element
RI Rank Indicator
RRC Radio Resource Control
RRH Remote radio head
RRM Radio Resource Management
RRM Radio Resource Management
RRU Remote radio unit
RSRP Reference signal received power
RSRQ Reference signal received quality
RSSI Received signal strength indicator
RX reception/receiver, reception-related
SA Scheduling Assignment
SCell Secondary Cell
SFN Single Frequency Network
SINR/SNR Signal-to-Noise-and-Interference Ratio; Signal-to-Noise Ratio
SON Self Organizing Network
SR Scheduling Request
SRS Sounding Reference Signal
SSS Secondary Synchronization Signal
TDD Time Division Duplexing
TPC Transmit Power Control
TTI Transmission-Time Interval
TX transmission/transmitter, transmission-related
UE User Equipment
USCH Uplink Shared CHannel
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency; generally, UL may refer to transmission by a terminal (e.g. to a network or network node or another terminal, for example in a D2D context).

These and other abbreviations may be used according to LTE standard definitions.

What is claimed is:

1. A method for operating a network node of a wireless communication network, the method comprising:
   determining a Hybrid Automatic Repeat Request (HARQ) signaling format for transmission of HARQ feedback on a Physical Uplink Shared Channel (PUSCH) from a terminal to a network node by determining a HARQ-ACK offset for the HARQ signaling format based on a number of HARQ bits configured for the terminal; and
   configuring the terminal to transmit the HARQ feedback on the PUSCH using the HARQ signaling format to multiplex HARQ feedback with user data transmitted on the PUSCH.

2. The method according to claim 1, wherein determining a HARQ signaling format further comprises determining an error detection coding for the HARQ feedback for the HARQ signaling format.

3. The method according to claim 1, wherein determining a HARQ signaling format further comprises determining a modulation for the HARQ signaling format.

4. The method according to claim 1, wherein determining a HARQ-ACK offset for the HARQ signaling format comprises adjusting a HARQ-ACK offset when the number of HARQ bits is above a bit threshold.

5. A network node for a wireless communication network, the network node comprising:
   a processor;
   memory containing instruction executable by the processor whereby the network node is operative to:
      determine a Hybrid Automatic Repeat Request (HARQ) signaling format for transmission of HARQ feedback on a Physical Uplink Shared Channel (PUSCH) from a terminal to a network node by determining HARQ-ACK offset for the HARQ signaling format based on a a number of HARQ bits configured for the terminal; and
      configure the terminal to transmit the HARQ feedback on the PUSCH using the HARQ signaling format to multiplex HARQ feedback with user data transmitted on the PUSCH.

6. The network node of claim 5, wherein the instructions are such that the network node is further operative to determine an error detection coding for the HARQ signaling format.

7. The network node of claim 5, wherein the instructions are such that the network node is further operative to determine modulation for the HARQ signaling format.

8. The network node of claim 5, wherein the instructions are such that the network node is operative to adjust a HARQ-ACK offset for the HARQ signaling format when a number of HARQ bits is above a bit threshold.

9. A method for operating a terminal in a wireless communication network, the terminal being configured for carrier aggregation, the method comprising:
   determining a Hybrid Automatic Repeat Request (HARQ) signaling format for transmission of HARQ feedback on a Physical Uplink Shared Channel (PUSCH) from the terminal to a network node by determining a HARQ-ACK offset for the HARQ signaling format based on a number of HARQ bits configured for the terminal; and
   transmitting HARQ feedback on the PUSCH using the HARQ signaling format to multiplex the HARQ feedback with user data on the PUSCH.

10. The method according to claim 9, wherein determining a HARQ signaling format further comprises adjusting an error detection coding for the HARQ feedback.

11. The method according to claim 9, wherein determining a HARQ signaling format further comprises adjusting a modulation for the HARQ signaling format.

12. The method according to claim 9, wherein determining a HARQ-ACK offset for HARQ signaling format comprises adjusting a HARQ ACK offset when the number of HARQ bits is above a bit threshold.

13. A terminal for a wireless communication network, the terminal adapted for carrier aggregation and comprising:
- a processor;
- memory containing instruction executable by the processor whereby the terminal is operative to:
  - determine a Hybrid Automatic Repeat request (HARQ) signaling format for transmission of HARQ feedback on a Physical Uplink Shared Channel (PUSCH) from the terminal to a network node by determining a HARQ-ACK offset for the HARQ signaling format based on a number of HARQ bits configured for the terminal; and
  - transmit HARQ feedback on an uplink shared channel using the HARQ signaling format to multiplex the HARQ feedback with user data on the uplink shared channel.

14. The terminal of claim 13, wherein the instructions are such that the terminal is further operative to adjust an error detection coding for the HARQ signaling format.

15. The terminal of claim 13, wherein the instructions are such that the terminal is further operative to adjust a modulation for the HARQ signaling format.

16. The terminal of claim 13, wherein the instructions are such that the terminal is operative to adjust a HARQ-ACK offset for the HARQ signaling format when the number of HARQ bits is above a bit threshold.

* * * * *

UNITED STATES PATENT AND TRADEMARK OFFICE
CERTIFICATE OF CORRECTION

PATENT NO. : 11,962,416 B2
APPLICATION NO. : 18/105619
DATED : April 16, 2024
INVENTOR(S) : Huss et al.

Page 1 of 2

It is certified that error appears in the above-identified patent and that said Letters Patent is hereby corrected as shown below:

In the Specification

In Column 1, Line 7, delete "2020," and insert -- 2020, now U.S. Pat. No. 11,606,171, --, therefor.

In Column 4, Line 28, delete "layer" and insert -- layer Q' --, therefor.

In Column 4, Lines 49-57, delete "
$$Q'_{temp} = \left[ \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right]$$
" and insert --
$$Q'_{temp} = \left[ \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right]$$
--, therefor.

In Column 5, Line 30, delete "III" and insert -- TTI --, therefor.

In Column 9, Line 45, delete "$I_{offset}^{HARQ-ACK}$ $I_{offset,MC}^{HARQ-ACK}$." and insert -- $I_{offset}^{HARQ-ACK}$ or $I_{offset,MC}^{HARQ-ACK}$. --, therefor.

In Column 11, Line 2, delete "of," and insert -- of M, --, therefor.

Signed and Sealed this
Third Day of December, 2024

Katherine Kelly Vidal
*Director of the United States Patent and Trademark Office*

CERTIFICATE OF CORRECTION (continued)
U.S. Pat. No. 11,962,416 B2

In Column 18, Line 36, delete "and/control" and insert -- and/or control --, therefor.

In Column 21, Line 46, delete "receiver" and insert -- received --, therefor.

In the Claims

In Column 24, Line 30, in Claim 5, delete "a a" and insert -- a --, therefor.

In Column 25, Line 1, in Claim 12, delete "HARQ ACK" and insert -- HARQ-ACK --, therefor.